US012691896B2

(12) United States Patent
Bechter et al.

(10) Patent No.: US 12,691,896 B2
(45) Date of Patent: Jul. 28, 2026

(54) COMPUTING DEVICE FOR A RADAR SENSOR

(71) Applicant: ZF Friedrichshafen AG, Friedrichshafen (DE)

(72) Inventors: Jonathan Bechter, Vöhringen (DE); Andreas Donges, Lindau (DE); Uwe Lüthin, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 246 days.

(21) Appl. No.: 18/155,591

(22) Filed: Jan. 17, 2023

(65) Prior Publication Data

US 2023/0227064 A1      Jul. 20, 2023

(30) Foreign Application Priority Data

Jan. 19, 2022    (DE) ..................... 10 2022 200 579.1

(51) Int. Cl.
*B60W 60/00*          (2020.01)

(52) U.S. Cl.
CPC ..... *B60W 60/001* (2020.02); *B60W 2420/408* (2024.01); *B60W 2554/4049* (2020.02)

(58) Field of Classification Search
CPC ....... B60W 60/001; B60W 2554/4049; B60W 2420/408
See application file for complete search history.

(56) References Cited

U.S. PATENT DOCUMENTS

| | | | |
|---|---|---|---|
| 10,969,463 B2 | 4/2021 | Melzer et al. | |
| 2019/0025404 A1* | 1/2019 | Farmer | ..................... G01S 7/40 |
| 2019/0041492 A1* | 2/2019 | Paradie | ................. G01S 13/931 |
| 2019/0064335 A1 | 2/2019 | Boutin et al. | |
| 2020/0072941 A1* | 3/2020 | Jansen | ................. G01S 13/345 |
| 2021/0209543 A1* | 7/2021 | Scott | .................... G06Q 10/083 |
| 2022/0026521 A1* | 1/2022 | Melzer | ..................... G01S 7/023 |
| 2023/0194664 A1* | 6/2023 | Strauss | .................. G06N 3/044 |
| | | | 342/196 |

FOREIGN PATENT DOCUMENTS

| | | |
|---|---|---|
| DE | 60315162 T2 | 4/2008 |
| DE | 102009032124 A1 | 1/2011 |
| DE | 102016103517 A1 | 8/2017 |
| DE | 102018123383 A1 | 4/2019 |
| WO | WO 2004015446 A1 | 2/2004 |

OTHER PUBLICATIONS

Office Action issued in corresponding German Patent Application Serial No. DE 10 2022 200 579.1, dated Sep. 29, 2022 (10 pages).

* cited by examiner

*Primary Examiner* — Adnan M Mirza

(74) *Attorney, Agent, or Firm* — Crowell & Moring LLP

(57) ABSTRACT

A computing device for a radar sensor for identifying a disruption of the radar sensor through blocking or interference includes at least one interface for receiving radar data from the radar sensor and at least one processing device configured to determine at least one characteristic figure for a range of values in a noise distribution in the radar data, in which at most few and/at most weakly reflecting objects are present, and evaluate the characteristic figure in order to identify a disruption of the radar sensor.

16 Claims, 6 Drawing Sheets

COMPUTING DEVICE FOR A RADAR SENSOR

CROSS-REFERENCE TO RELATED APPLICATION

This application claims priority to German Application No. DE 10 2022 200 579.1, filed on Jan. 19, 2022, the entirety of which is hereby fully incorporated by reference herein.

TECHNICAL FIELD

The present disclosure relates to a computing device for a radar sensor that identifies disruptions to the radar sensor caused by blocking or interference. The present disclosure also relates to a corresponding radar sensor and an automated vehicle. The present disclosure further relates to a method implemented with a computer for identifying disruptions to a radar sensor caused by blocking or interference, and to a corresponding computer program.

BACKGROUND

There are various methods in the prior art for identifying interference and radar blocking. These methods normally do not have a consistent model. In particular, either interference or blocking can be detected with the known methods, and it is not possible to characterize the detected disruption.

SUMMARY

A computing device for a radar sensor with which a disruption of the radar sensor caused by blocking or interference is identified is proposed. The computing device comprises at least one interface for receiving radar data from the radar sensor. The computing device comprises at least one computing module with which at least one characteristic figure for a range of values in a noise distribution in the radar data is determined in which at most few and/or at most weakly reflecting targets are present, and the characteristic figure is evaluated in order to identify a disruption of the radar sensor.

The radar sensor (Radio Detection and Ranging sensor) is preferably an FM-CW (Frequency-Modulated Continuous-Wave) sensor. The radar sensor comprises at least one antenna, preferably at least one antenna array, at least one analog-digital converter, at least one modulator, and/or other components that appear reasonable to a person skilled in the art. The radar sensor is preferably intended for use in an automated vehicle. The radar sensor is intended in particular for the detection of objects in the environment of the automated vehicle, e.g. the road, other road users, infrastructure, features of the landscape, etc. An "automated vehicle" is understood to be a vehicle operated at one of the automation levels 1 to 5 in the SAE J3016 standard. In particular, the automated vehicle is equipped to be operated at these automation levels. This includes environment detection sensors, i.e. radar sensors, lidar sensors, cameras and/or acoustic sensors, stereo devices, etc. The automated vehicle is preferably a land vehicle. The automated vehicle can be a passenger automobile, a truck, an agriculture vehicle, or some other vehicle that appears reasonable to the person skilled in the art. The automated vehicle can also be an aircraft, e.g. a drone, airplane, helicopter, vertical take-off and landing aircraft, etc. or a water vessel, in particular a ship, boat, etc. The term "intended" in this context means specially programmed, specially equipped, and/or specially designed. If an object is "intended" for a specific function, this means that the object can carry out this function in at least one operating state.

In particular, a control unit, e.g. an electronic control unit, in the automated vehicle can comprise, or at least in part form, the computing device. A control unit prepares sensor data as input signals, processes them with the computing device, in particular with the computing module, e.g. a programmable logic module, an FPGA or ASIC module, or a computer platform, and can allocate logic and/or power levels as control or regulating signals. Actuators for longitudinal and/or lateral steering of the vehicle, for example, can be controlled or regulated using the control or regulating signals, in order to keep the vehicle in a lane and/or to predict a trajectory thereof. The control unit is preferably integrated in the vehicle electrical system, e.g. a CAN bus. The control unit is an electronic control unit for automated driving functions, referred to in English as a domain ECU. In particular, the control unit can be an ADAS (advanced driver assistance system)/AD (autonomous driving) domain ECU for assisted to fully automated, i.e. autonomous, driving. It is also conceivable for the radar sensor to comprise the computing device. In particular, the computing device can be designed as a signal processor in the radar sensor.

The computing device, in particular the computing module, is formed as a system on a chip (SoC) for example, with modular hardware components, meaning that all or at least most of the functions are integrated on a chip and can be expanded in a modular manner. The chip can be integrated in particular in the control unit or the radar sensor. The computing device, in particular the computing module, comprises a multi-core processor and storage modules. The multi-core is configured for signal/data exchange with storage media. By way of example, the multi-core processor comprises a bus system. The storage modules form a computer memory. The storage modules are RAMs, DRAMs, SDRAMs, or SRAMs. A multi-core processor has numerous cores on a single chip, i.e. a semiconductor component. Multi-core processors have a high level of computing power and are less expensive to implement in a chip than multiprocessor systems in which each individual core is located in a processor socket, and the individual processor sockets are located on a motherboard. The computing device, in particular the computing module, comprises at least one central processing unit (CPU) according to one aspect of the present disclosure.

The computing device, in particular the computing module, also preferably comprises at least one graphics processing unit (GPU). The graphics processing units have a special microarchitecture for parallel processing sequences. The graphics processing unit comprises at least one processing unit that is designed specifically to carry out tensor and/or matrix multiplication according to one aspect of the present disclosure. Tensor and/or matrix multiplication form the central computing operations for deep learning. The computing device, in particular the computing module, also comprises hardware accelerators for artificial intelligence according to one aspect of the present disclosure, e.g. so-called deep learning accelerators. Another aspect of the present disclosure provides for a classifier. In this case, software code segments in the classifier are processed directly by the GPU. The computing device or control unit are preferably configured such that they can be expanded in a modular manner with numerous, e.g. at least four, chips of this sort.

The interface in the computing device is preferably intended for data exchange. In particular, the data exchange takes place in the form of signal transfer of an electrical signal. This data exchange at the interface can be hardwired or wireless. The interface is preferably intended to supply the computing module with data, in particular radar data, from the at least one radar sensor connected to the computing module via the interface for data exchange.

A disruption of the radar sensor can be caused in particular by blocking of the radar sensor or through interference caused by electromagnetic waves from another radar sensor. The radar sensor may be blocked in particular when a large object such as another vehicle in the close proximity of the radar sensor blocks a large part of radar sensor's the field of vision. The term, "close proximity" refers to a distance to the radar sensor of no more than 10 meters, preferably no more than 5 meters, particularly preferably no more than 2 meters, and very particularly preferably no more than 1 meter. The term, "large part" with regard to the field of vision for the radar sensor is understood to mean more than 50%, preferably more than 70%, and particularly preferably more than 90% of the radar's field of vision. The radar sensor is designed in particular to emit radar beams and receive radar beams reflected in the environment for the purpose of environment detection. If another radar sensor also sends out radar beams into the same environment, these beams may also be received by the radar sensor, resulting in interference. Disruption of the radar sensor through blocking or interference results in increased noise, a reduction in the probability of detecting an object, and a reduction in the number of objects that are detected in each cycle in comparison with a radar sensor that is not subjected to a disruption.

The radar sensor is preferably designed to emit a sequence of frequency ramps and sample them over time with numerous receivers. By way of example, 64 to 2048 frequency ramps can be used, which are each sampled, for example, at 512 equidistant points in time. The sampling can take place in parallel, in particular at 4 to 48 receiving channels. This results in a dataset referred to as a so-called radar cube. The radar data from the radar sensor comprise the radar cube, in particular in the form of a radar cube. The computing device, in particular the computing module, is preferably configured to process the radar cube in order to extract objects therefrom. Radar signal processing can comprise, e.g. fast Fourier transformations, filtering, demodulation, etc. The radar signal processing can comprise steps for disruption identification and/or suppression in particular, that differ from the disruption identification described herein.

The computing module is preferably configured to estimate the amount of noise in the radar data, in particular by means of a statistical process, specifically after or during the radar signal processing. The computing module is preferably configured to determine a noise distribution ($\xi_n$) as a function of a distance ($r_i$). In particular, the computing module is configured to determine a noise value ($\xi_n[r_i]$) for each distance that is sampled. A distance coordinate corresponds in particular to a reciprocal sampling coordinate. The computing module is preferably configured to determine the noise value with statistical approach, e.g. based on a 77% quantile. It is also conceivable to configure the computing module to determine the noise value using a statistical approach based on another quantile, or with an averaging approach.

Noise values in the data cells of the radar cube that are adjacent to data cells from strongly reflecting objects are highly amplified, but this does not relate to any disruption of the radar sensor. In particular, the computing module is configured to determine at least one characteristic figure for a range of values for the noise distribution in the radar data, in which at most few and/or at most weakly reflecting objects are present in order to account for an effect caused by strongly reflecting objects when a disruption is identified. In particular, in the range of values for the noise distribution in which at most few and/or at most weakly reflecting objects are present, an increased noise level in comparison to that with an undisrupted radar sensor is only expected if there is a disruption of the radar sensor. The computer is preferably configured to determine the characteristic figure for the range of values using a statistical approach, e.g. with a 16% quantile. In particular, the characteristic figure for the range of values of the noise distribution in which at most few and/or at most weakly reflecting objects are present, corresponds at most to a 50% quantile, preferably at most to a 35% quantile, particularly preferably at most to a 20% quantile, and very particularly preferably at most to a 5% quantile of the noise distribution.

The computing module is preferably configured to evaluate the characteristic figure for the range of values regarding an increased noise level in comparison with an undisrupted radar sensor, in order to identify a disruption of the radar sensor. In particular, the computing module is configured to evaluate the characteristic figure for the range of values in order to identify a disruption of the radar sensor. The computing module is preferably configured to evaluate the characteristic figure for the range of values in order to determine the type of disruption to the radar sensor, in particular to determine if it is caused by blocking or interference.

The computing module is preferably dedicated to a single radar sensor, and in particular is at least partially integrated in the radar sensor. In particular, the computing device is configured to evaluate radar data from a single radar sensor. In particular, the automated vehicle can contain numerous radar sensors, in which each radar sensor has at least one dedicated computing device. The computing device could also be dedicated to numerous radar sensors. In particular, the computing device can be configured to evaluate radar data from numerous radar sensors.

A disruption of a radar sensor can be advantageously detected with the design of the computing device obtained with the present disclosure. Different types of disruptions, in particular blocking and interferences, can be advantageously detected in a consistent model. This advantageously results in a computing device that ensures a high level of traffic safety.

It is also proposed that the computing module is configured to compare the characteristic figure for the range of values in the noise distribution with an equivalent characteristic figure for an equivalent range of values in a reference noise distribution, in particular with regard to a disruption threshold value, in order to identify a disruption of the radar sensor. The reference noise distribution $$\left(\xi_n^{MA}\right)$$

is a noise distribution in particular that is representative for an undisrupted radar sensor. The abbreviation "MA" stands for "moving average." The computing module is preferably configured to determine the equivalent characteristic figure for the equivalent range of values in the reference noise distribution that is analogous to the characteristic figure for the range of values in the noise distribution, in particular by means of a statistical approach, e.g. as a 16% quantile. The disruption threshold value (T) is a predetermined value, and it can be assumed that, depending on a difference between the characteristic figure for the range of values for the noise distribution and the equivalent characteristic figure for the equivalent range of values for the reference noise distribution, it will be greater than the disruption threshold value for a disruption of the radar sensor. The characteristic figure for the range of values in the noise distribution is defined, for example, by the 16% quantile. The disruption threshold value can be stored in a memory in the computing device. The disruption threshold value can be a value that seems reasonable to a person skilled in the art, e.g. 4 decibels.

In particular, the computing module can determine an effective increase in a noise level in a radar cycle (n) in relation to the reference noise distribution.

The computing module is preferably configured to determine the effective increase in the noise level ($\hat{\xi}_n$) as $$\hat{\xi}_n = \frac{P_N[\xi_n] - P_N[\xi_n^{MA}]}{T}$$

in which $P_N$ describes the determination of a N % quantile, e.g. the 16% quantile. The computing module is preferably configured to determine that there is a disruption of the radar sensor if an effective increase in the noise level is determined to be greater than 1. The computing module is preferably configured to determine that there is no disruption of the radar sensor if the effective increase in noise level is determined to be less than 1. The presence of a disruption to the radar sensor can advantageously be determined precisely.

It is also proposed that the computing module is configured to update the reference noise distribution with the noise distribution of a current radar cycle on the basis of an undisrupted radar sensor, in particular through a moving averaging. The computing module is preferably configured to update the reference noise distribution with the noise distribution of the current radar cycle through cumulative or exponential moving averaging on the basis of the undisrupted radar sensor. With exponential moving averaging, the computing module can update the reference noise distribution, in particular for each sampled distance ($r_i$), as $$\xi_{n+1}^{MA}[r_i] = (1 - \alpha_n)\xi_n^{MA}[r_i] + \alpha_n\xi_n[r_i],$$

where $\alpha_n$ is an accumulation rate, which is selected independently of the radar cycle. A precise reference noise distribution can then be advantageously provided for further radar cycles.

It is also proposed that the computing module is configured to determine the type of disruption in a disrupted radar sensor on the basis of at least one leakage signal. Leakage signals occur in particular when receiver modules and transmitter modules are coupled, as is the case in particular with radar sensors. Receiver modules are designed in particular to receive radar beams, and transmitter modules are designed to transmit radar beams. Leakage signals result in particular in an increase in phase noise if a relationship of a reception signal to a transmission signal exceeds the separation between reception modules and transmission modules. Leakage signals are particularly strong if a strongly reflecting object is in the close proximity of the radar sensor. In particular, the leakage signals are stronger in the case of a blocking of the radar sensor than in the case of interference. The computing module is configured specifically to determine the type of disruption to the radar sensor, in particular a blocking or interference, on the basis of the strength of the leakage signal. The disruption can advantageously be characterized in this manner.

It is also proposed that the computing module is configured to compare an average increase in a noise level in a predetermined frequency range with at least one upper threshold value and at least one lower threshold value, in order to determine the type of disruption. The predetermined frequency range (I) is a low frequency range, in particular for distance coordinates i≈0 and i≈$i_{max}$. The low frequency range comprises a few bins with a frequency of 0 Hz, in particular. The noise level in the predetermined frequency range is composed in particular of no more than 5, preferably no more than 3, and particularly preferably no more than 2 noise values. The computing module can determine the average increase in noise level in a predetermined frequency range ($\tilde{\xi}_n$) in a radar cycle (n) in relation to the reference noise distribution as $$\tilde{\xi}_n = \frac{1}{|I|}\sum_{i \in I} \xi_n[r_i] - \xi_n^{MA}[r_i].$$

The upper threshold value $$(S_n^+)$$

describes a stronger leakage signal than the lower threshold value $$(S_n^-).$$

The threshold values can preferably be a function of the effective increase in the noise level. In particular, a robust distinction can be made between interference and blocking disruptions through the relationships of the threshold values to the effective increase in noise level, even with a weak disruption of the radar sensor ($\hat{\xi}_n \approx 1$). The type of disruption can be precisely determined in this manner.

It is also proposed that the computing module be configured to classify the disruption as blocking if the upper threshold value is exceeded by the average increase in noise level in a predetermined frequency range, and to classify the disruption as interference if the average increase in noise level falls below the lower threshold value in the predetermined frequency range. The computing module is preferably configured to implement countermeasures, depending on the type of disruption, in particular those known to the person skilled in the art, in order to counteract the disruption. The computing module can preferably be configured to execute the method for identifying disruptions described herein in combination with other methods for interference identification, interference suppression, and/or blocking identification known to the person skilled in the art. It is consequently advantageously possible to distinguish between blocking and interference in the event of radar sensor disruption.

It is also proposed that the computing module is configured to determine the distance from a radar sensor to a blocking object on the basis of a characteristic modulation in the noise distribution when a radar sensor is blocked. The characteristic modulation occurs in particular in the case of multiple reflections of the radar beam. The characteristic modulation is a periodic modulation in whole number multiples of the distance from the radar sensor to the blocking object. The computing module is preferably configured to determine the distance from the radar sensor to the blocking object by evaluating a characteristic modulation in the noise distribution using a pattern recognition algorithm. The pattern recognition algorithm can be designed, for example, as an algorithm for locating local peak values and checking distances between the local peak values for whole number multiples. The distance from the radar sensor to the blocking object can therefore advantageously be determined.

A radar sensor is also proposed. The radar sensor comprises at least one computing device according to the present disclosure. In particular, the computing device can at least be partially integrated in a housing for the radar sensor. A printed circuit board, in particular a chip, in the radar sensor preferably comprises the computing device. The radar sensor can be designed in particular as an MMIC (Monolithic Microwave Integrated Circuit) radar sensor. The present disclosure advantageously provides a radar sensor that results in a high level of traffic safety.

An automated vehicle is also proposed. The automated vehicle comprises at least one radar sensor according to the present disclosure, or at least one computing device according to the present disclosure and at least one radar sensor without a computing device. The automated vehicle can comprise numerous radar sensors, e.g. on different sides of the automated vehicle, and/or computing devices. An automated vehicle can advantageously be provided that results in a high level of traffic safety.

It is also proposed that the automated vehicle comprises at least one vehicle control unit, and the computing device contains at least one additional interface for sending at least one disruption signal to the vehicle control unit when a disruption of the radar sensor has been identified, and the vehicle control unit is configured to increase a weighting of the other sensors in the automated vehicle in a sensor fusion on the basis of the disruption signal. The computing module is preferably configured to specify the disruption signal on the basis of the determined disruption, in particular the type of disruption, in accordance with an identification of the disruption. If the disruption is caused by blocking, the disruption signal can at least comprise data regarding the distance from the radar sensor to the blocking object. The additional interface can preferably be analogous to the first interface, in particular with regard to its functionality. The computing module is preferably connected for data transfer to the vehicle control unit with the additional interface.

The vehicle control unit can be designed in particular as a control unit, i.e. a central control unit for the automated vehicle. In particular, the vehicle control unit can comprise the computing device. The vehicle control unit is preferably configured to control movement, in particular a driving mode, of the automated vehicle. The vehicle control unit can be configured in particular to control actuators for longitudinal and lateral guidance of the automated vehicle. An actuator for the lateral guidance can be designed, for example, as an electric motor for an electromechanical power steering. The vehicle control unit can preferably control various functions of the automated vehicle in response to disruption signals. By way of example, the vehicle control unit can at least specify a warning signal and/or initiate an automated driving maneuver for the automated vehicle in response to a disruption signal. Other sensors in the automated vehicle can be additional radar sensors, lidar sensors, cameras, etc. The vehicle control unit is configured in particular to take data from the other sensors more strongly into account in the sensor fusion than the data from the disrupted radar sensor in response to the disruption signal. This advantageously further increases traffic safety.

A computer-implemented method is also proposed for identifying a disruption of a radar sensor caused by blocking or interference. At least one characteristic figure for a range of values in a noise distribution in data received from the radar sensors is determined in which at most few and/or at most weakly reflecting objects are present. The characteristic figure for the range of values is evaluated in order to identify a disruption of the radar sensor. A method for identifying a disruption of a radar sensor can advantageously be provided that results in a high level of traffic safety.

A computer program is also proposed for identifying a disruption caused by blocking or interference. The computer program comprises commands with which a computing device according to the present disclosure can execute a method according to the present disclosure when the program is executed. A computer program for identifying a disruption of a radar sensor can advantageously be provided that results in a high level of traffic safety.

The present disclosure shall be explained in greater detail in reference to two exemplary embodiments illustrated in the following figures.

DETAILED DESCRIPTION

Figure 1:
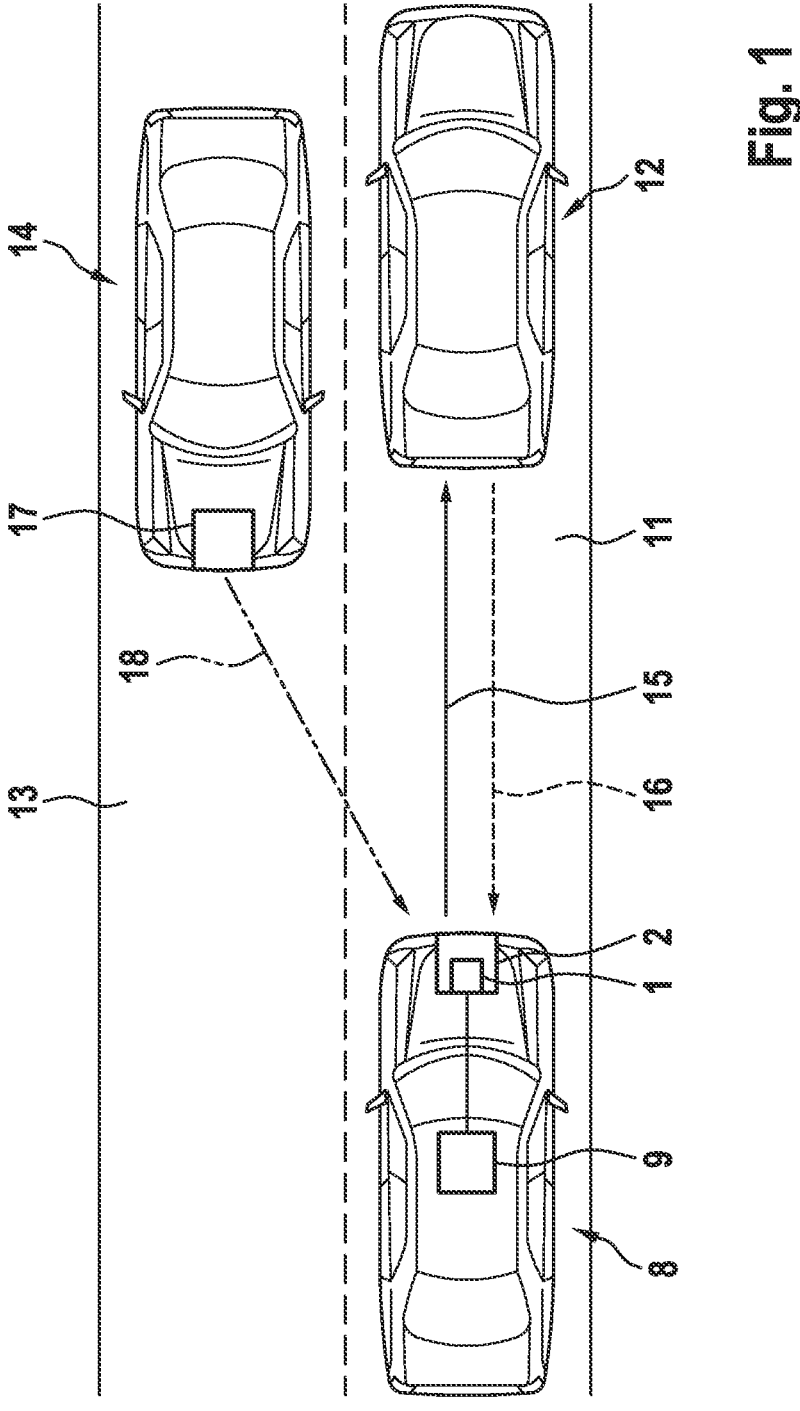
FIG. 1 shows a schematic illustration of an automated vehicle according to various embodiments of the present disclosure.

FIG. 1 shows a schematic illustration of an automated vehicle 8. The automated vehicle 8 is shown in an environment for the automated vehicle 8. The automated vehicle 8 is designed as a land vehicle, in particular a passenger automobile. The automated vehicle 8 is traveling, by way of example, in the same lane 11 and same direction as another vehicle 12, behind this vehicle 12. Another vehicle 14 is traveling in the opposite direction of the automated vehicle 8, in an adjacent lane 13 to the first lane 11.

The automated vehicle 8 comprises a radar sensor 2. This radar sensor 2 is designed to detect objects in the environment of the automated vehicle 8. For this environment detection, the radar sensor 2 is designed to emit radar beams 15 and receive radar beams 16 reflected by objects in the environment. In the present exemplary embodiment, the radar sensor 2 emits beams 15 toward the second vehicle 12, and receives beams 16 reflected by the second vehicle 12 in order to detect the second vehicle 12. By way of example, the third vehicle 14 in the present exemplary embodiment comprises another radar sensor 17 that emits its own beams 18, in particular in the same or a similar frequency band as the beams 15 from the first radar sensor 2. The second beams 18 can be received by the radar sensor 2, resulting in interference in this radar sensor 2. In the present exemplary embodiment, the second vehicle 12 is too far away from the automated vehicle 8, in particular the radar sensors therein, to be able to cause a blocking of the radar sensor 2.

The automated vehicle 8 comprises at least one computing device 1 for identifying a disruption of the radar sensor 2 caused by blocking or interference, which in this case is formed by interference, by way of example. In the present exemplary embodiment, the radar sensor 2 in the automated vehicle 8 comprises the computing device 1, by way of example. The computing device 1 comprises at least one interface 3 for receiving radar data from the radar sensor 2 (cf. FIG. 3). The computing device 1 comprises at least one computing module 4 that is configured to determine at least one characteristic figure for a range of values in a noise distribution in the radar data, in which at most few and/or at most weakly reflecting objects are present (cf. FIG. 3). The computing module 4 is configured to evaluate the characteristic figure to identify a disruption of the radar sensor 2. The computing module 4 is configure to evaluate the characteristic figure to determine the type of disruption to the radar sensor 2, in particular a blocking or interference.

The computing module 4 is configured to specify at least one disruption signal corresponding to an identification of the disruption on the basis of the disruption, in particular the type of disruption. The computing device 1 contains at least one additional interface 10 for providing the disruption signal to at least one vehicle control unit 9 in the automated vehicle 8 on the basis of the disruption of the radar sensor 2 that has been identified (cf. FIG. 3). The vehicle control unit 8 is configured to control movement of the automated vehicle 8, in particular a driving mode. The vehicle control unit 8 is configured to increase the weighting of the other sensors in the automated vehicle 8 in a sensor fusion on the basis of the disruption signal (not shown herein).

Figure 2:
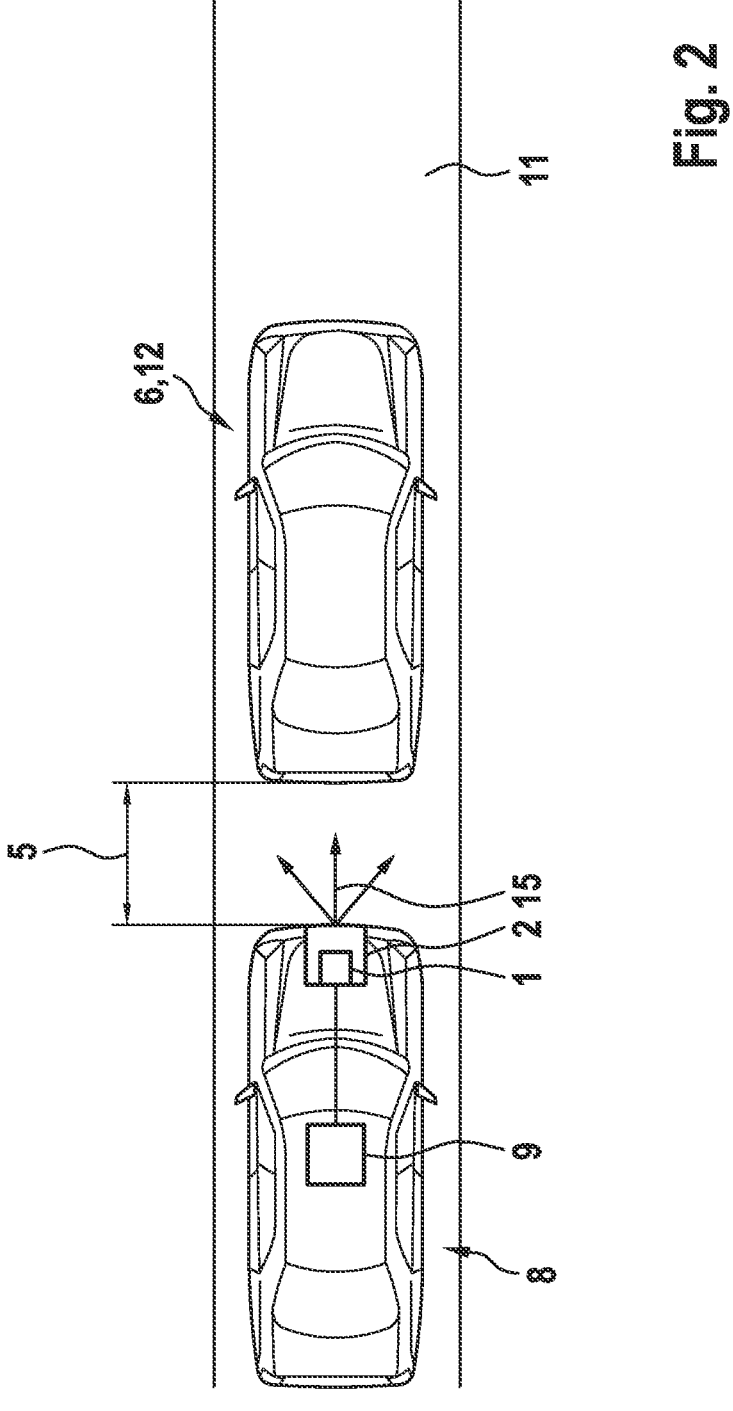
FIG. 2 shows another schematic illustration of the automated vehicle according to various embodiments of the present disclosure shown in FIG. 1.

FIG. 2 shows the automated vehicle shown in FIG. 1 in another schematic illustration. In the present exemplary embodiment, the third vehicle 14, which caused the interference with its radar sensor 17, is not there. The second vehicle 12 is located in the close proximity of the radar sensor 2, and blocks a large portion of a field of view of the radar sensor 2. The second vehicle 12 blocks the radar sensor 2, such that the radar sensor 2 is blocked in a disrupting manner. The second vehicle 12 forms a blocking object 6. The distance from the blocking object 6 to the radar sensor 2 in the automated vehicle 8 is at most 10 meters in the present exemplary embodiment.

Figure 3:
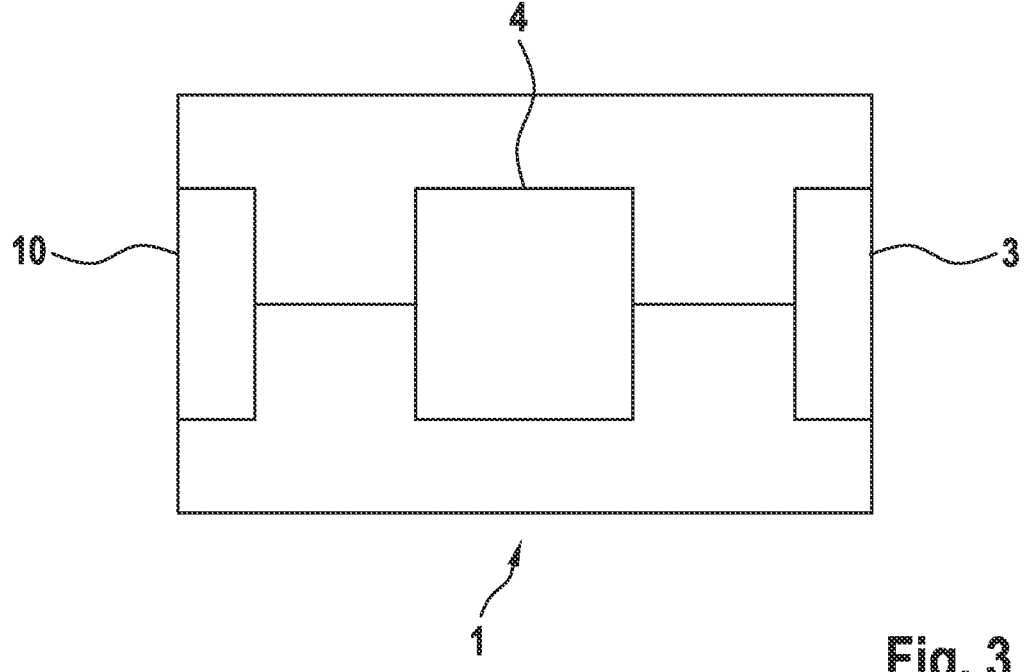
FIG. 3 shows a schematic illustration of a computing device according to various embodiments of the present disclosure for the automated vehicle according to the various embodiments shown in FIG. 1 and FIG. 2.

FIG. 3 shows a schematic illustration of the computing device 1 in the automated vehicle 8 shown in FIG. 1 and FIG. 2. The computing device 1 comprises the computing module 4, the first interface 3, and the second interface 10. The computing module 4 is configured to compare the characteristic figure for the range of values in the noise distribution with an equivalent characteristic figure for an equivalent range of values in a reference noise distribution, in particular with regard to a disruption threshold value, in order to identify a disruption of the radar sensor 2. The computing module 4 is configured to update the reference noise distribution with the noise distribution of a current radar cycle, in particular through a moving averaging, on the basis of an undisrupted radar sensor 2.

The computing module 4 is configured to determine the type of disruption in a disrupted radar sensor 2 on the basis of at least one leakage signal. The leakage signal is stronger in the case of a blocking of the radar sensor 2 than in the case of interference to the radar sensor 2. The computing module 4 is configured to compare an average increase in a noise level within a predetermined frequency range with at least one upper threshold value and at least one lower threshold value in order to determine the type of disruption. The computing module is configured to classify the disruption as blocking if the upper threshold value is exceeded by the average increase in the noise level in a predetermined frequency range, and to classify the disruption as interference if the average increase in the noise level falls below the lower threshold value in the predetermined frequency range.

Figure 4:
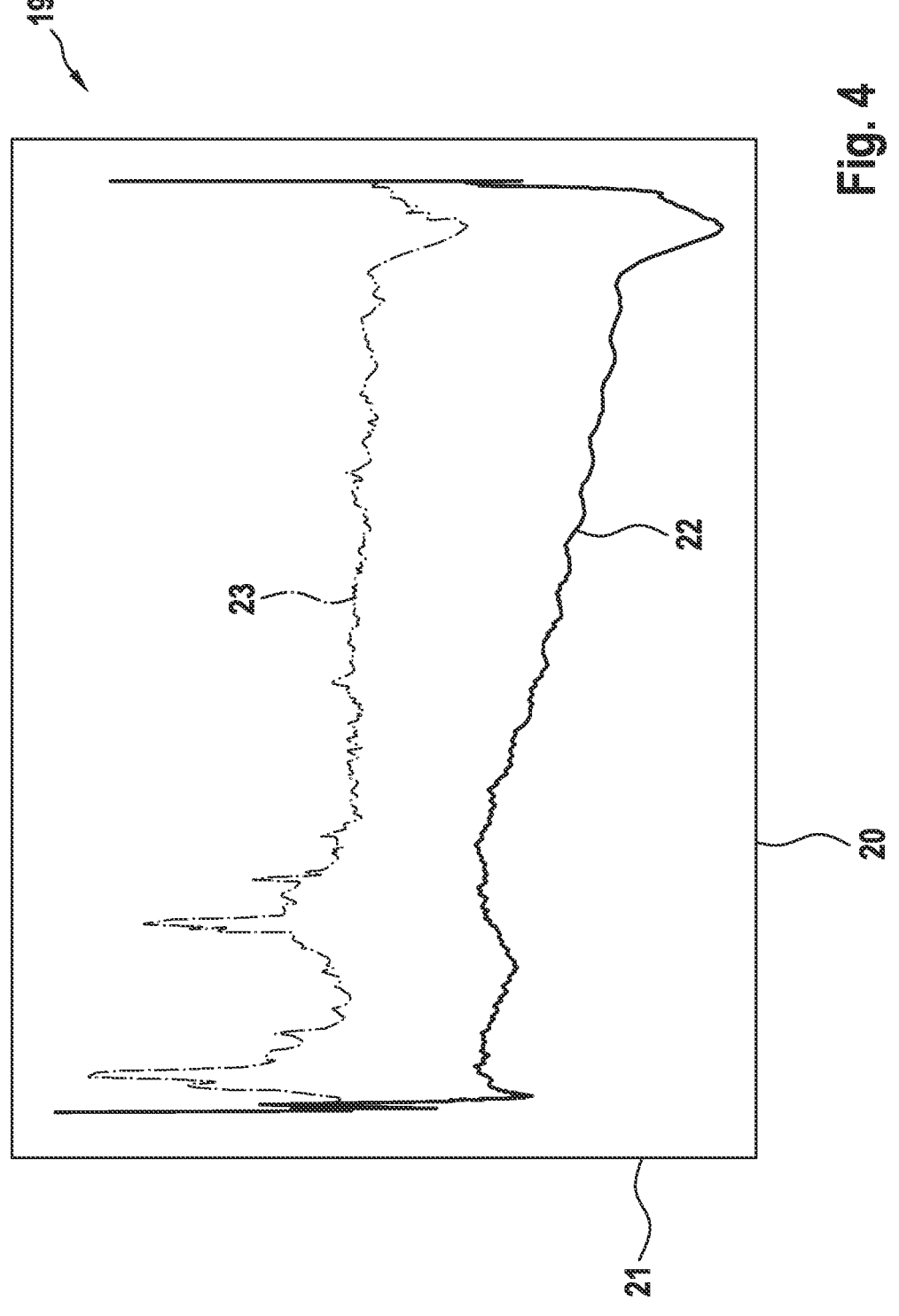
FIG. 4 shows a schematic illustration of a noise distribution as a function of interference to a radar sensor according to various embodiments of the present disclosure in the automated vehicle shown in FIG. 1.

FIG. 4 shows a schematic illustration of a noise distribution as a function of interference to the radar sensor 2 in the automated vehicle 8 shown in FIG. 1. This is shown in a graph 19 that has an abscissa axis 20 and an ordinate axis 21. Distance is plotted on the abscissa axis 20. The noise level is plotted on the ordinate axis 21. A first curve 22 represents a reference noise distribution for a radar sensor 2 without disruption. The second curve 23 represents a noise distribution in a current radar cycle while the radar sensor 2 is subjected to interference, as shown by way of example in FIG. 1. The noise level in the case of interference is significantly higher than the undisrupted noise level for the most part.

Figure 5:
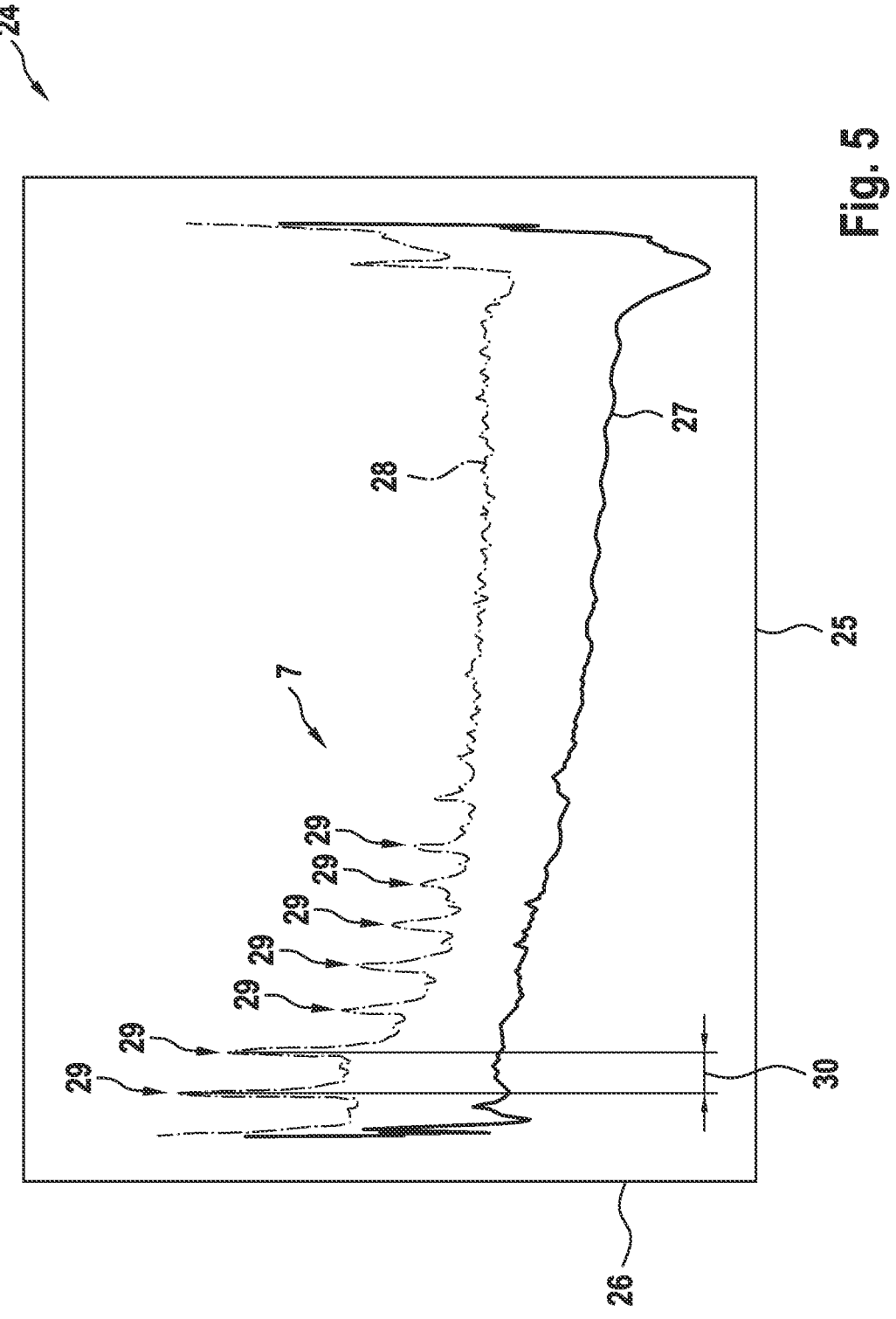
FIG. 5 shows a schematic illustration of a noise distribution as a function of blocking the radar sensor according to various embodiments of the present disclosure.

FIG. 5 shows a schematic illustration of a noise distribution as a function of a blocking of the radar sensor 2. This is also a graph containing an abscissa axis 25 and an ordinate axis 26. Distance is plotted on the abscissa axis 26. The noise level is plotted on the ordinate axis 26. A third curve 27 represents a reference noise distribution for a radar sensor 2 without disruption. The third curve 27 corresponds to the first curve 22 in FIG. 4. A fourth curve 28 represents a noise distribution for a current radar cycle in which the radar sensor 2 is disrupted by blocking, as shown by way of example in FIG. 2. The noise level in the case of blocking is significantly higher than the noise level in the undisrupted case and the noise level in the interference case over a complete spectrum, (cf. FIG. 4).

The computing module 4 is configured to determine the distance 5 from the radar sensor 2 to a blocking object 6 on the basis of a characteristic modulation 7 in the noise distribution in the case of a blocking of the radar sensor 2. The computing module 4 is configured to determine the distance 5 from the radar sensor 2 to the blocking object 6 by evaluating the characteristic modulation 7 in the noise distribution using a pattern recognition algorithm. The pattern recognition algorithm can be designed as an algorithm for finding local peak values 29 and checking distances 30 between the local peak values 20 for whole number multiples. By way of example, seven local peak values 29 and the distance 30 between two adjacent local peak values 29 are indicated in FIG. 5.

Figure 6:
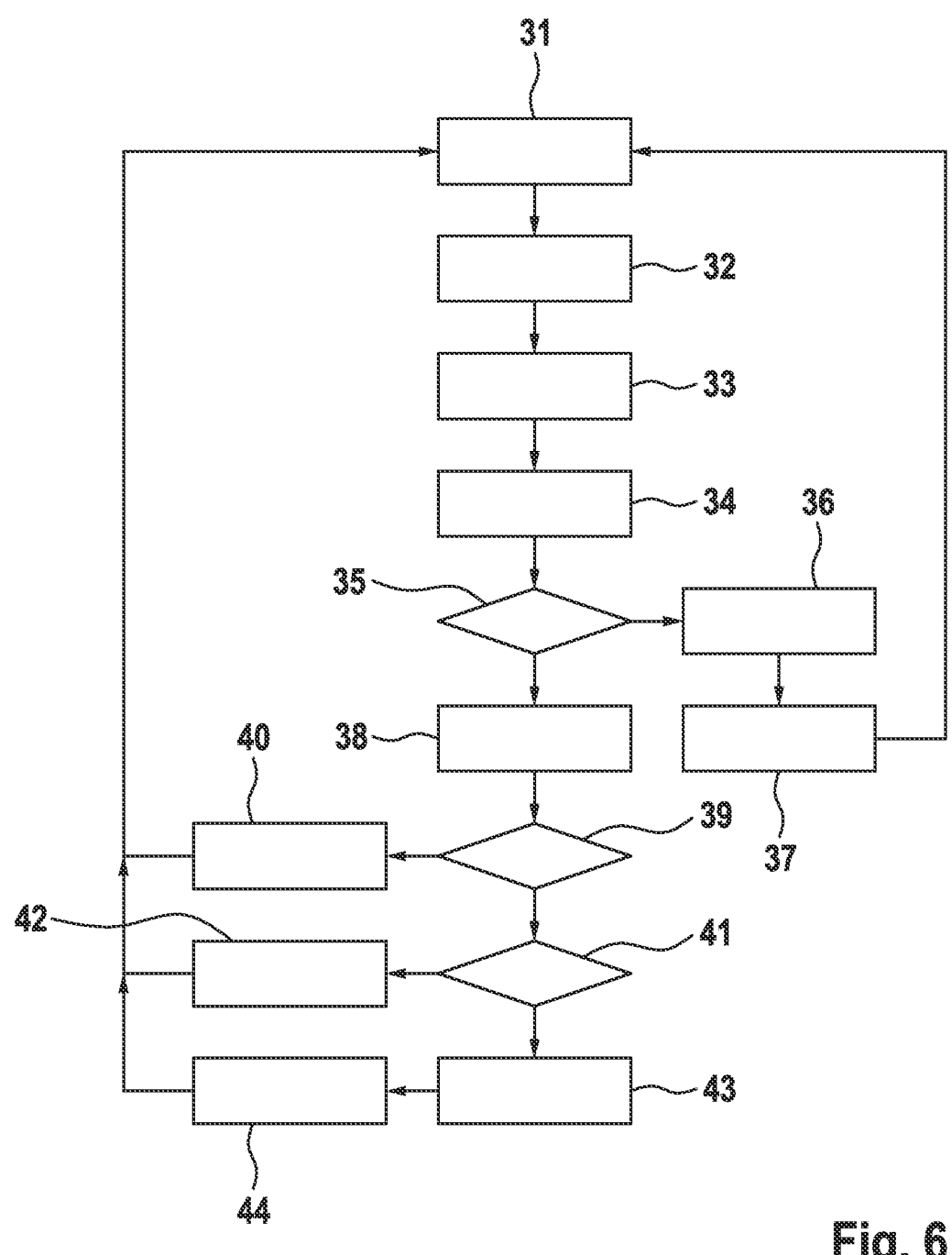
FIG. 6 shows a schematic illustration of a flow chart for method according to various embodiments of the present disclosure.

FIG. 6 shows a schematic illustration of a flow chart for a method for identifying a disruption of a radar sensor 2 by blocking or interference. A single radar cycle is shown. In a first method step 31, radar data are obtained, in particular in the form of a radar cube. In a second method step 32, the radar data, in particular the radar cube, are processed, in particular to extract radar targets therefrom. In a third method step 33, noise levels in the radar data are estimated, in particular by means of a statistical method.

At least one characteristic figure for a range of values in a noise distribution in the radar data from the radar sensor 2, in which at most few and/or at most weak reflecting objects are present, is determined in a fourth method step 34. In a fifth method step 35, the characteristic figure for the range of values is evaluated in order to identify a disruption of the radar sensor 2. In the fifth method step 35, the characteristic figure for the range of values in the noise distribution is compared with an equivalent characteristic figure for an equivalent range of values in a reference noise distribution, in particular with regard to a disruption threshold value, in order to identify a disruption of the radar sensor 2.

Based on an undisrupted radar sensor 2, in particular on the basis of a difference between the characteristic figure for the range of values in the noise distribution and the equivalent characteristic figure for the equivalent range of values in the reference noise distribution that is smaller than the disruption threshold value, the reference noise distribution is updated in a sixth method step 36 with the noise distribution for the current radar cycle, in particular through moving averaging. In a seventh method step 37, the radar cycle is labeled as valid, and a new radar cycle is started.

Based on a disrupted radar sensor 2, in particular on the basis of a difference between the characteristic figure for the range of values in the noise distribution and the equivalent characteristic figure for the equivalent range of values in the reference noise distribution that is greater than the disruption threshold value, the type of disruption is determined in an eight method step 38, in particular on the basis of at least one leakage signal.

On the basis of a first result 39, in which the type of disruption is not clear, the radar cycle is labeled as disrupted in a ninth method step 40, and a new radar cycle is started. On the basis of a second result 41, in which there is interference, the radar cycle is labeled as disrupted by interference in a tenth method step 42, and a new radar cycle is started.

On the basis of a third result, in which there is blocking, the distance 5 to the blocking object 6 is determined in an eleventh method step 43, in particular on the basis of a characteristic modulation 7 in the noise distribution. In a twelfth method step 44, the radar cycle is labeled as disrupted by blocking, and a new radar cycle is started. At least the method steps 32-38, 40 and 42-44 can be implemented with a computer.

A computer program for identifying a disruption of the radar sensor 2 through blocking or interference comprises commands with which at least part of the method, in particular method steps 32-38, 40 and 42-44, are executed by the computing device when the program is executed thereon.

REFERENCE SYMBOLS 1 computing device
2 radar sensor
3 interface
4 computing module
5 distance
6 object
7 modulation
8 vehicle
9 vehicle control unit
10 interface
11 driving lane
12 vehicle
13 driving lane
14 vehicle
15 beam
16 beam
17 second radar sensor
18 second beam
19 graph
20 abscissa axis
21 ordinate axis
22 curve
23 curve
24 graph
25 abscissa axis
26 ordinate axis
27 curve
28 curve
29 peak value
30 distance
31 method step
32 method step
33 method step
34 method step
35 method step
36 method step
37 method step
38 method step
39 result
40 method step
41 result
42 method step
43 method step
44 method step

The invention claimed is:

1. A computing device for a radar sensor for identifying disruptions of the radar sensor through blocking or interference, comprising:
  at least one interface configured to receive radar data from the radar sensor; and
  at least one processing device configured to:
    determine at least one characteristic figure for a range of values in a noise distribution in the radar data, in which at most only a few and/or at most only weakly reflecting objects are present;
    evaluate the characteristic figure to identify a disruption of the radar sensor;
    determine a type of disruption in a disrupted radar sensor on a basis of at least one leakage signal, wherein the leakage signal occurs due to a coupling of an output radar signal of a transmitter module of the radar sensor into a receiver module of the radar sensor; and
    compare an average increase in the noise level in a predefined frequency range with at least one upper threshold level and at least one lower threshold level in order to determine the type of disruption.

2. The computing device according to claim 1, wherein the at least one processing device is configured to evaluate the characteristic figure by:
  comparing the characteristic figure for the range of values in the noise distribution with an equivalent characteristic figure for an equivalent range of values in a reference noise distribution with respect to a disruption threshold value in order to identify the disruption of the radar sensor.

3. The computing device according to claim 1, wherein the at least one processing device is configured to:

update the reference noise distribution with a noise distribution in a current radar cycle on a basis of an undisrupted radar sensor using moving averaging.

4. The computing device according to claim 1, wherein the at least one processing device is configure to:

classify the disruption as blocking in response to the upper threshold value being exceeded by the average increase in the noise level in the predetermined frequency range; and classify the disruption as interference in response to the average increase in the noise level falling below a lower threshold value in the predetermined frequency range.

5. The computing device according to claim 1, wherein the at least one processing device is configured to:

determine a distance from the radar sensor to a blocking object in the case of a blocking of the radar sensor on a basis of a characteristic modulation in the noise distribution.

6. A radar sensor comprising the computing device according to claim 1.

7. An automated vehicle comprising the radar sensor according to claim 6.

8. An automated vehicle comprising the computing device according to claim 1.

9. The automated vehicle according to claim 8 comprising at least one radar sensor without a computing device.

10. The automated vehicle according to claim 8, comprising:

at least one vehicle control unit, wherein the computing device comprises at least one additional interface configured to provide at least one disruption signal to the vehicle control unit on a basis of an identified disruption of the radar sensor, wherein the vehicle control unit is configured to increase a weighting of other sensors in the automated vehicle in a sensor fusion on the basis of the disruption signal.

11. A computer-implemented method for identifying a disruption of a radar sensor through blocking or interference, the method comprising:

determining at least one characteristic figure for a range of values in a noise distribution in radar data that have been received from the radar sensor, in which at most few and/or at most weakly reflecting objects are present;

evaluating the characteristic figure for the range of values in order to identify a disruption of the radar sensor;

determining a type of disruption in a disrupted radar sensor on a basis of at least one leakage signal, wherein the leakage signal occurs due to a coupling of an output radar signal of a transmitter module of the radar sensor into a receiver module of the radar sensor; and comparing an average increase in the noise level in a predefine frequency range with at least one upper threshold level and at least one lower threshold level in order to determine the type of disruption.

12. The computing-implemented method according to claim 11, wherein evaluating the characteristic figure comprises:

comparing the characteristic figure for the range of values in the noise distribution with an equivalent characteristic figure for an equivalent range of values in a reference noise distribution with respect to a disruption threshold value in order to identify the disruption of the radar sensor.

13. The computing-implemented method according to claim 11, further comprising:

updating the reference noise distribution with a noise distribution in a current radar cycle on a basis of an undisrupted radar sensor using moving averaging.

14. The computing-implemented method according to claim 11, further comprising:

classifying the disruption as blocking in response to the upper threshold value being exceeded by the average increase in the noise level in the predetermined frequency range; and classifying the disruption as interference in response to the average increase in the noise level falling below a lower threshold value in the predetermined frequency range.

15. The computing-implemented method according to claim 11, further comprising:

determining a distance from the radar sensor to a blocking object in the case of a blocking of the radar sensor on a basis of a characteristic modulation in the noise distribution.

16. A non-transitory computer-readable medium comprising a computer program that, when executed by a computing device, cause the computing device to perform the method according to claim 11.

* * * * *